United States Patent
Chae et al.

(10) Patent No.: US 7,436,803 B2
(45) Date of Patent: Oct. 14, 2008

(54) APPARATUS AND METHOD FOR DETERMINING A SOFT HANDOVER IN A CDMA MOBILE COMMUNICATION SYSTEM

(75) Inventors: Chan-Byoung Chae, Songnam-shi (KR); In-Bum Chang, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 995 days.

(21) Appl. No.: 10/341,937

(22) Filed: Jan. 14, 2003

(65) Prior Publication Data

US 2003/0137953 A1 Jul. 24, 2003

(30) Foreign Application Priority Data

Jan. 14, 2002 (KR) .................. 10-2002-0001982

(51) Int. Cl.
*H04Q 7/00* (2006.01)
(52) U.S. Cl. .................. 370/331; 370/332; 370/333; 455/442
(58) Field of Classification Search .................. None
See application file for complete search history.

(56) References Cited

U.S. PATENT DOCUMENTS

| | | | | |
|---|---|---|---|---|
| 6,049,716 A | * | 4/2000 | Jung | 455/442 |
| 6,151,502 A | * | 11/2000 | Padovani et al. | 455/442 |
| 6,233,455 B1 | * | 5/2001 | Ramakrishna et al. | 455/437 |
| 6,337,984 B1 | * | 1/2002 | Hong et al. | 455/439 |
| 6,353,602 B1 | * | 3/2002 | Cheng et al. | 370/332 |
| 6,532,221 B1 | * | 3/2003 | Kim et al. | 370/332 |
| 6,754,493 B1 | * | 6/2004 | Jetzek | 455/436 |
| 6,907,245 B2 | * | 6/2005 | Ohlsson et al. | 455/442 |
| 2002/0048266 A1 | * | 4/2002 | Choi et al. | 370/331 |
| 2002/0049060 A1 | * | 4/2002 | Grob et al. | 455/441 |
| 2002/0071403 A1 | * | 6/2002 | Crowe et al. | 370/331 |
| 2002/0094837 A1 | * | 7/2002 | Hamabe et al. | 455/522 |
| 2002/0102977 A1 | * | 8/2002 | Shi | 455/437 |

* cited by examiner

*Primary Examiner*—Chi H. Pham
*Assistant Examiner*—Albert T Chou
(74) *Attorney, Agent, or Firm*—The Farrell Law Firm, PC

(57) ABSTRACT

A mobile station that determines whether to perform a soft handover in a CDMA mobile communication system and method thereof. The mobile station compares strength of a signal received from a source BTS (Base Transceiver Station) with a prescribed reference value. If the strength of the signal received from the source BTS is larger than the reference value, the mobile station determines whether to perform a soft handover based on a new offset value being smaller than a previous hysteresis no matter how strong a signal received from a target BTS is.

8 Claims, 9 Drawing Sheets

APPARATUS AND METHOD FOR DETERMINING A SOFT HANDOVER IN A CDMA MOBILE COMMUNICATION SYSTEM

This application claims priority to an application entitled "Apparatus and Method for Determining Soft Handover in a CDMA Mobile Communication System" filed in the Korean Industrial Property Office on Jan. 14, 2002 and assigned Serial No. 2002-1982, the contents of which are incorporated herein by reference.

BACKGROUND OF THE INVENTION

1. Field of the Invention

The present invention relates generally to a soft handover method in a CDMA (Code Division Multiple Access) mobile communication system, and in particular, to an apparatus and method for determining whether to perform a soft handover.

2. Description of the Related Art

Commonly, a CDMA mobile communication system uses a cell structure in order to support as many users as possible with limited RF (Radio Frequency) resources. That is, the CDMA mobile communication system divides its entire service area into a plurality of small regions, called a "cell," and separately assigns RF resources to the cells, thereby supporting more users. Here, "cell" refers to a region covered by a specific base transceiver station (BTS), and the cells are identified through unique scrambling codes used by the associated BTSs.

Therefore, in the CDMA mobile communication system, when a mobile station (MS) located in a specific cell moves toward another cell, it is necessary to continue the service even in the new cell through a handover. That is, the "handover" refers to a successive operation of switching a service to a new cell when an MS moves from a region (or cell) of a current BTS in service (hereinafter, referred to as a "source BTS") to a new BTS (hereinafter, referred to as a "target BTS"). To this end, the MS measures strength of signals received from neighbor cells in order to determine whether a handover is possible. The strength of the received signals can be expressed with Ec/Io [dB].

The handover can be divided into a soft handover and a hard handover. The soft handover is performed in such a manner that when a handover is requested, an MS sets up a new channel to a target BTS in a state where a channel is set up to a source BTS, and then releases one of the two channels at a prescribed point of time. The hard handover is performed in such a manner that when a handover is requested, an MS releases a channel set up to a source BTS and then sets up a new channel to a target BTS. Here, a traffic channel can represent the channel.

The soft handover improves service quality to the MS, but must disadvantageously simultaneously use channels to the source BTS and the target BTS. In contrast, the hard handover may use any one of the channels connected to the source BTS and the target BTS, but cannot disadvantageously guarantee good service quality. Generally, the soft handover is supported by a digital CDMA mobile communication system, and the hard handover is supported by an analog mobile communication system and some digital mobile communication systems. The hard handover is used for a handover between FAs or mobile switching centers (MSCs) in some digital mobile communication systems. Particularly, in an asynchronous mobile communication system, the hard handover is used for data service. Herein, a description will be made with reference to only the soft handover among the two kinds of the handover.

FIG. 1 conceptually illustrates a soft handover performed in a CDMA mobile communication system. Referring to FIG. 1, an MS 114 located in a cell#1 covered by a source BTS 110 moves to a handover region 115. Commonly, the MS 114 simultaneously receives signals from the source BTS 110 and a target BTS 112 neighboring to the source BTS 110, and determines whether a handover is requested, by measuring strength of the two received signals and comparing the measured signal strengths. In FIG. 1, the MS 114 measures strength of the signals received from the source BTS 110 and the target BTS 112 when the MS 114 is located in the handover region 115. However, the MS 114 may measure strength of the signal received from the target BTS 112 even though it is located in the cell#1. Therefore, if the MS 114, as it moves to the handover region, receives a signal with prescribed strength from the target BTS 112, the MS 114 transmits to the source BTS 110 a pilot strength measurement message for requesting a handover. Upon receiving the pilot strength measurement message, the source BTS 110 reports receipt of the pilot strength measurement message to a base station controller (BSC; not shown), so that the BSC performs a soft handover procedure on the MS 114 for a predetermined time period. The BSC determines whether to perform a soft handover by checking prescribed conditions through the soft handover procedure, and transmits a handover direction message to the MS 114 if it is determined that the soft handover is possible. When a handover is completed after a lapse of a prescribed time, the MS 114 transmits a handover completion message to the BSC in reply to the handover direction message. At this point, a new channel set up to the target BTS 112, which enters an active state.

As described above, the MS 114 separately measures strengths of a signal received from the source BTS 110 and a signal received from the target BTS 112, and determines whether to perform a handover based on the measured signal strengths.

FIGS. 2 and 3 illustrate an ideal handover performed in a conventional CDMA mobile communication system. FIGS. 2 and 3 assume strength of a signal received from a source BTS and strength of a signal received from a target BTS in an ideal radio channel environment. That is, FIGS. 2 and 3 exclude a case where the signals received from the source BTS and the target BTS are unstable due to a characteristic of an actual radio channel environment.

Now, a general method for determining by the MS whether to perform a handover based on strengths of the signals received from the source BTS and the target BTS will be described with reference to FIGS. 2 and 3.

First, a first method for determining whether to perform a handover, using a prescribed threshold, will be described with reference to FIG. 2.

Referring to FIG. 2, the MS measures strength P_target of a pilot channel from the target BTS while performing a service with the source BTS. The pilot channel is a channel for transmitting a pilot signal to check a condition of a radio channel. If strength P_target of the pilot channel from the target BTS exceeds a prescribed threshold T_ADD, the MS transmits the pilot channel measurement result to the source BTS through a prescribed message. Thereafter, the MS sets up a traffic channel to the target BTS.

After setting up a traffic channel to the target BTS, the MS measures strength P_source of a signal received from the source BTS. The strength P_source of a signal received from the source BTS can be measured depending on a signal transmitted over the traffic channel. If the strength P_source of the signal received from the source BTS is lower than a prescribed threshold T_DROP, the MS drives a handover drop timer to determine whether a drop time Δt expires. If a state where the strength P_source of the signal received from the source BTS is lower than the prescribed threshold T_DROP continues for the drop time Δt, the MS releases a channel to the source BTS. Therefore, the MS changes the target BTS to a new source BTS, and receives a service from the new source BTS. The MS receives the Δt value from the source BTS through a measurement control message.

The first method determines a handover by comparing strengths of signals received from the source BTS and the target BTS with two thresholds T_ADD and T DROP. However, this method is disadvantageously susceptible to noises.

In order to solve such a problem, a second handover method has been proposed. The second method for determining whether to perform a handover, by comparing strengths of a signal received from a source BTS and a signal from a target BTS, will be described with reference to FIG. 3.

Referring to FIG. 3, the MS measures strengths P_source and P_target of signals received from the source BTS and the target BTS, and calculates a difference, ΔP1=P_source-P_target, between the strengths P_source and P_target of the two received signals. Here, the strength P_target of the signal received from the target BTS can be measured depending on a pilot signal transmitted over a pilot channel. The MS determines whether the ΔP1 satisfies a condition that the ΔP1 is lower than a prescribed reference value (e.g., 2 dB). The reference value becomes a criterion for determining whether to perform a handover. If a state where the calculated ΔP1 satisfies the reference condition (i.e., the ΔP1 is lower than the reference value) continues a predetermined time Δt, the MS transmits the measurement result of a pilot channel from the target BTS to the source BTS through a prescribed message. Thereafter, the MS sets up a traffic channel to the target BTS.

After setting up a traffic channel to the target BTS, the MS measures strengths, P_source and P_target, of signals received from the source BTS and the target BTS, and then calculates a difference, ΔP2=P_target-P_source, between the strengths P_source and P_target of the two received signals. The MS determines whether the ΔP2 satisfies a condition that the ΔP2 is higher than a prescribed reference value (e.g., 4 dB). The reference value becomes a criterion for determining whether to release the traffic channel currently set up to the source BTS in order to end a handover. If the calculated ΔP2 satisfies the reference condition (i.e., the ΔP2 is higher than the reference value), the MS determines whether a prescribed time Δt expires. If a state where the calculated ΔP2 satisfies the reference condition (i.e., the ΔP2 is higher than the reference value) continues for the prescribed time Δt, the MS releases the channel set up to the source BTS. Therefore, the MS changes the target BTS to a new source BTS, and receives a service from the new source BTS. The MS receives the Δt value from the source BTS.

The second handover method has no problem because a handover is normally performed in an ideal radio channel environment or a good radio channel environment. However, a handover may unnecessarily frequently occur in a region having a poor radio-wave condition such as a downtown area with large buildings.

Such examples are illustrated in FIG. 4. That is, FIG. 4 illustrates examples where a handover may unnecessarily occur in a conventional CDMA mobile communication system.

In FIG. 4, there is a case where a difference between strengths of signals received from a source BTS and a target BTS is lower than a prescribed reference value (e.g., 2 dB), as a radio channel environment for the target BTS becomes abruptly better or a radio channel environment for the source BTS becomes abruptly worse. The case where a radio channel environment for the target BTS becomes abruptly better is represented by reference numerals 410, 450, 420, and 430. The case where a radio channel environment for the source BTS becomes abruptly worse is represented by reference numeral 440. Among others, the reference numerals 410, 420, and 430 represent unnecessary handovers. If such a situation occurs, the MS will set up a traffic channel to the target BTS through a handover procedure. In the meantime, if a radio channel environment for the target BTS or the source BTS becomes stable, the traffic channel set up to the target BTS will be released.

When the above-stated conventional handover methods are applied, an unnecessary handover region occurs in the downtown or in a radio channel environment having an unstable radio-wave condition, causing a reduction in capacity of mobile stations that can be serviced by a target BTS. Particularly, in a specific region having a low probability that a normal handover will occur, such as a downtown area, an unnecessary handover operation may occur due to an external factor such as a building.

In such a conventional CDMA mobile communication system, whether to perform a soft handover is determined based on the same condition regardless of whether the radio-wave environment is good or not, so efficiency of MS capacity is undesirably reduced in a region having a poor radio-wave environment.

SUMMARY OF THE INVENTION

It is, therefore, an object of the present invention to provide an apparatus and method for preventing an unnecessary soft handover from occurring in a CDMA mobile communication system.

It is another object of the present invention to provide an apparatus and method for diversifying hysteresis for determining to perform a soft handover in a CDMA mobile communication system.

It is further another object of the present invention to provide an apparatus and method for newly calculating hysteresis based on a difference between strength of a signal received from a source BTS and strength of a signal received from a target BTS.

According to a first aspect of the present invention, there is provided a method for determining by a mobile station whether to perform a soft handover based on measured strengths of a signal received from a source BTS to which a traffic channel is currently set up, and a signal received from at least one target BTS in a CDMA mobile communication system. The method comprises determining whether a difference between strength P_source _t1 of the signal received from the source BTS and strength P_target_t1 of the signal received from the target BTS at a prescribed time t1 satisfies a handover request error where the soft handover is requested; if the soft handover is requested, controlling an offset error based on a difference between the strength P_source_t1 of the signal received from the source BTS and a prescribed reference value H_refer; and performing a procedure for the soft handover if the difference between the strength P_source_t1 of the signal received from the source BTS and the strength P_target_t1 of the signal received from the target BTS is smaller than or equal to the controlled offset error.

According to a second aspect of the present invention, there is provided a method for determining whether to perform a soft handover when a difference between strength of a signal received from a source BTS to which a traffic channel is currently set up, and strength of a signal received from a at least one target BTS at a prescribed time in a CDMA mobile communication system. The method comprises controlling an offset error in proportion to an absolute value of a difference between a strength of a signal received from the source BTS and a prescribed reference value; and performing a procedure for the soft handover if the difference between the strength of the signal received from the source BTS and the reference value is smaller than or equal to the controlled offset error.

According to a third aspect of the present invention, there is provided an apparatus for determining by a mobile station whether to perform a soft handover based on a difference between a strength of a signal received from a source BTS to which a traffic channel is currently set up, and a strength of a signal received from at least one target BTS in a CDMA mobile communication system. The apparatus comprises a first finger for receiving a signal from the source BTS and measuring strength of the received signal; a second finger for receiving a signal from the target BTS and measuring strength of the received signal; and a controller for controlling an offset error in proportion to a difference between strength of a signal received from the source BTS and a prescribed reference value if a difference between the measured signal strength from the first finger and the measured signal strength from the second finger at a prescribed time satisfies a handover request error where the handover is requested, and performing a procedure for the soft handover if the difference between the strength of the signal received from the source BTS and the reference value is equal to the controlled offset error.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 7:
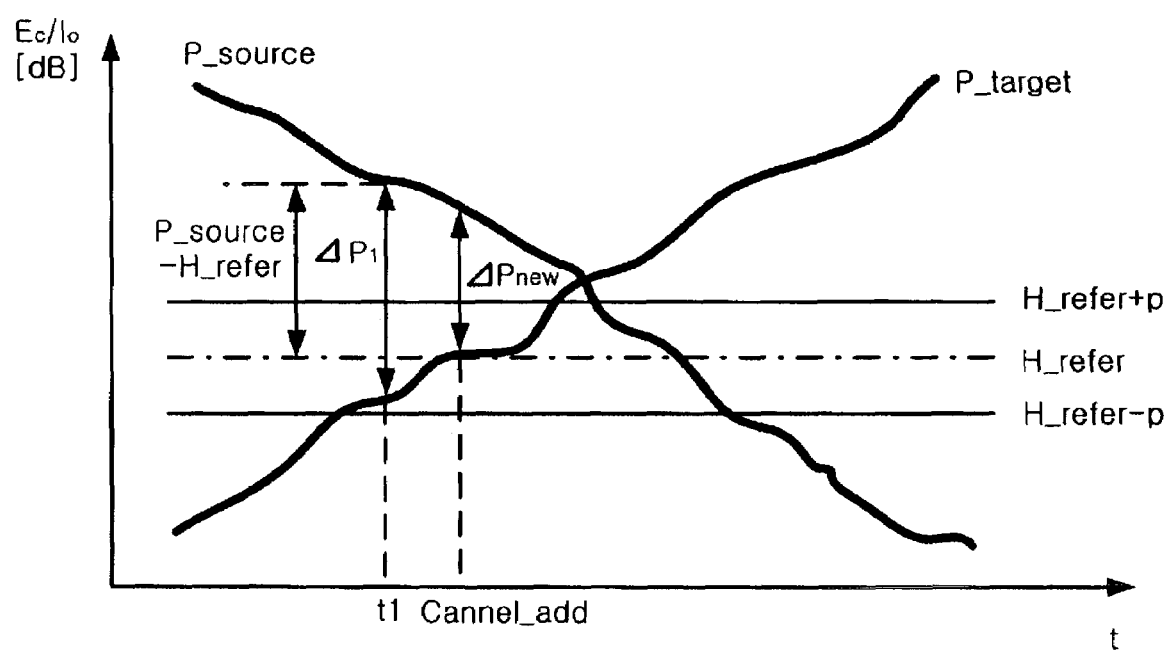
FIG. 7 illustrates an example where a soft handover occurs in a CDMA mobile communication system according to an embodiment of the present invention.

FIG. 7 conceptually illustrates a method for determining by an MS whether to perform a soft handover in a CDMA mobile communication system according to an embodiment of the present invention. Referring to FIG. 7, an MS separately measures strengths P_source and P_target of signals received from a source BTS and a target BTS while receiving a service from the source BTS. Although FIG. 7 assumes that the MS receives a signal received from only one target BTS, it would be obvious to those skilled in the art that the MS may receive signals from a plurality of target BTSs. The MS calculates a difference $\Delta P1$ between the strengths P_source_t1 and P_target_t1 of the two received signals at a particular time t1. The MS determines whether the $\Delta P1$ satisfies a condition that the $\Delta P1$ is lower than a prescribed reference value (e.g., 2 dB). The reference value is an error, which becomes a criterion for determining whether to perform a handover. Herein, the "error" will be referred to as a "handover request error." In addition, a state where the $\Delta P1$ satisfies a condition that the $\Delta P1$ is lower than a prescribed reference value (e.g., 2 dB) will be referred to as a "handover request state." If the calculated $\Delta P1$ satisfies the handover request error, the MS calculates a difference, P_source_t1-H_refer, between strength P_source_t1 of a signal received from the source BTS and a prescribed reference value H_refer at a prescribed time t1. If an absolute value of the calculated difference P_source_t1-H_refer is larger than or equal to a prescribed condition P, the MS calculates a new offset error $\Delta Pnew$. If the difference between the strengths P_source_t1 and P_target_t1 of the two received signals is lower than the calculated new offset error $\Delta Pnew$, the MS performs a soft handover procedure. Here, "performing a soft handover procedure" refers to immediately activating a timer for a handover. That is, the conventional method immediately activates a timer if a difference between signals received from two BTSs is smaller than or equal to a previously assigned offset error value. However, a method proposed by the present invention applies a newly calculated offset error (smaller than the previous offset error) instead of immediately activating a timer, if the signal strength P_source is greater than H_refer+p even though the difference between signals received from two BTSs is equal to or smaller than the previously assigned offset error, and thus activates the timer only when the condition is satisfied, thereby to perform the existing handover.

As described above, the present invention adds a process of comparing the strength P_source of a signal received from the source BTS with the H_refer, and thereby performs a soft handover procedure only when a difference between the two signal strengths is equal to the new offset error no matter how a signal received from the target BTS is strong when the P_source is larger than the H-refer. Here, the new offset error is set smaller than the previous offset error provided from a BSC, so that the soft handover can be performed only when strength of a signal received from the target BTS is stably maintained for a long time.

Though not illustrated in FIG. 7, the UE can use a new offset error even. It is difficult to perform the soft handover because the strength P_target_t1 of a signal received from the target BTS is low, even though the strength P_source_t1 of the signal received from the source BTS is lower than the reference value H_refer. Here, the new offset error is set larger than the previous offset error, so that soft handover can be performed as quickly as possible.

Figure 5:
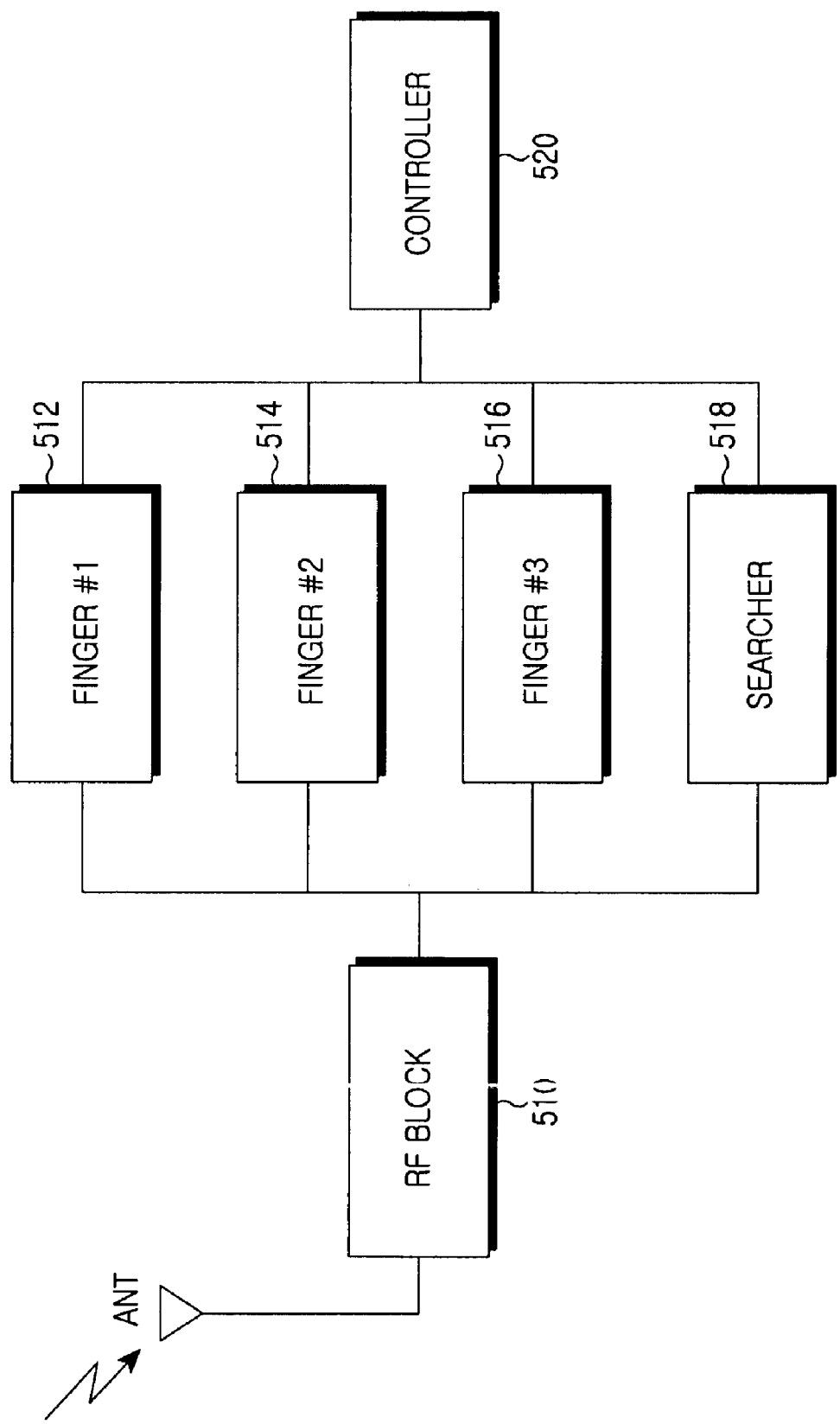
FIG. 5 illustrates a structure of a mobile station for performing a handover by determining a handover situation in a CDMA mobile communication system according to an embodiment of the present invention.

FIG. 5 illustrates a structure of a mobile station for measuring strengths of signals received from a plurality of BTSs in a CDMA mobile communication system according to an embodiment of the present invention. Referring to FIG. 5, signals from a source BTS and at least one target BTS are received through an antenna ANT, and the received signals are provided to an RF block 510. The RF block 510 converts the received signals into IF (Intermediate Frequency) signals. The IF signals output from the RF block 510 are provided to first to third fingers 512-516, and a searcher 518. Signals received from different BTSs are applied to the first to third fingers 512-516. For example, a signal received from the source BTS is applied to the first finger 512, and signals received from different target BTSs are applied to the second finger 514 and the third finger 516, respectively. The first to third fingers 512-516 each measure strength of their received signals and output the measurement results. A controller 520 performs a successive procedure for determining whether to perform a soft handover based on the strengths of the signals received from the source BTS and the target BTS, measured by the first to third fingers 512-516. In addition, the controller 520 controls a procedure for performing a soft handover to the source BTS and the corresponding target BTS according to the determination. A procedure for determining by the controller 520 whether to perform the soft handover is performed in accordance with a flowchart illustrated in FIG. 6.

Figure 6:
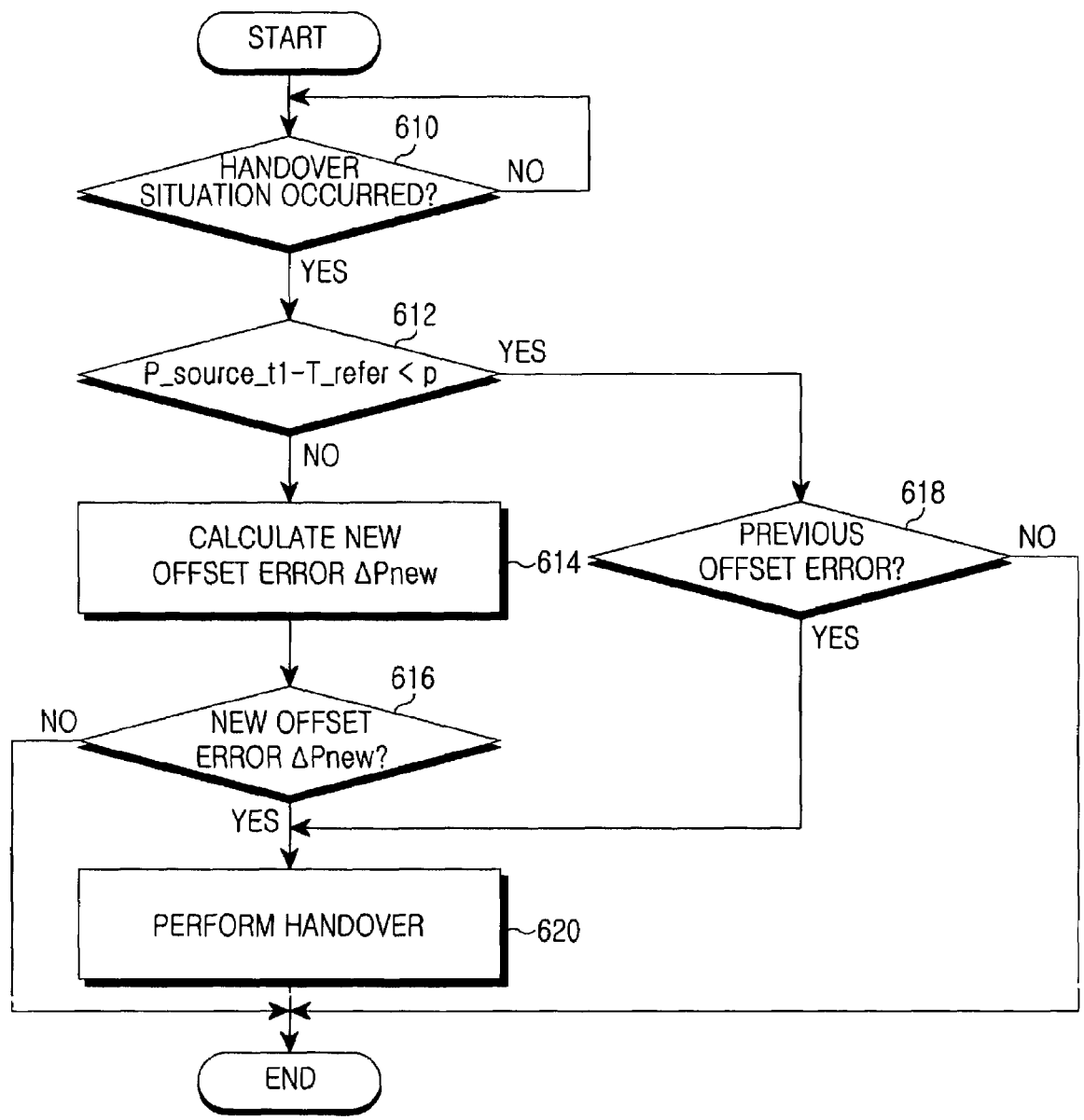
FIG. 6 is a flowchart illustrating a soft handover procedure by a mobile station in a CDMA mobile communication system according to an embodiment of the present invention.

FIG. 6 is a flowchart illustrating a procedure for determining by an MS whether to perform a soft handover in a CDMA mobile communication system according to an embodiment of the present invention. In FIG. 6, an MS receives signals from a source BTS and a target BTS through an antenna ANT, while receiving a service from the source BTS. The signals received from the source BTS and at least one target BTS through the antenna ANT are applied to the RF block 510, and the RF block 510 converts the received signals into IF signals. The received signals output from the RF block 510 are provided to the first to third fingers 512-516. For example, the received signal from the source BTS is provided to the first finger 512, and the received signals from the target BTSs are provided to the second finger 514 and the third finger 516. Therefore, the first finger 512 measures strength P_source of the signal received form the source BTS, and the second finger 514 and the third finger 516 measure strength P_target of the signals received from the target BTSs. The signal strengths P_source and P_target measured by the first to third fingers 512-516 are provided to the controller 520. The measured signal strengths P_source and P_target may correspond to an Ec/Io value.

In step 610, the controller 520 determines whether a handover situation has occurred. That is, the controller 520 calculates a difference ΔP1 between strengths P_source_t1 and P_target_t1 of the received signals, provided from the first finger 512 and the second finger 514 or the third finger 516 at a prescribed time t1. After calculating the ΔP1, the controller 520 compares the ΔP1 with a prescribed handover request error to determine whether a handover situation has occurred. If the ΔP1 is smaller than the handover request error, the controller 520 determines that a handover request state, i.e., a handover situation, has occurred.

If the handover situation occurs, the controller 520 calculates in step 612 a difference, P_source_t1-H_refer, between the P_source_t1 and a prescribed reference value H_refer. The reference value H_refer may correspond to an Ec/Io value, and can be defined as proper signal strength required for performing a service. Further, the controller 520 determines whether an absolute value of the calculated difference P_source_t1-H_refer is smaller than a particular value p. The particular value p can be defined as a threshold value for designating upper and lower limits on the basis of the reference value H_refer. In addition, the p must be determined by experiments so that a soft handover may occur in a reasonable situation. If the absolute value of the calculated difference P_source_t1-H_refer is smaller than the value p, the controller 520 proceeds to step 618, and otherwise, the controller 520 proceeds to step 614. A case where the condition in step 612 is satisfied corresponds to a case where the P_source_t1 belongs to a range of H_refer±p, and a case where the condition in step 612 is not satisfied can be divided into a case where the calculated difference P_source_t1-H_refer is a negative number and a case where the calculated difference P_source_t1-H_refer is a positive number. The case where the calculated difference P_source_t1-H_refer is a positive number indicates that the P_source_t1 is larger than a value H_refer+p determined by adding the p to the reference value H_refer. However, the case where the calculated difference P_source_t1-H_refer is a negative number indicates that the P_source_t1 is smaller than a value H_refer−p determined by subtracting the p from the reference value H_refer.

The controller 520 monitors in step 618 whether a difference between the two signal strengths P_source_t1 and P_target_t1 is equal to a previous offset error. The previous offset error is used to perform a handover only when a difference between the two signal strengths P_source_t1 and P_target_t1 reaches a predetermined value. It is possible to use the same value as the handover request error previously provided from a BSC through a measurement control message or used for detecting occurrence of the handover situation. Therefore, the controller 520 uses the intact previous offset error when the P_source_t1 belongs to a range H_refer±p having upper and lower limits 'p' on the basis of the H_refer, in steps 612 and 618.

As mentioned above, the previous offset error is provided from the source BTS through a measurement control message. Thereafter, the controller 520 detects occurrence of a handover situation based on the previous offset error, and does not immediately activate a timer according to the signal strength. That is, the controller 520 continuously monitors the newly calculated offset error, and determines whether to activate the timer if the measured value is smaller than or equal to the newly calculated offset error.

More specifically, the controller 520 calculates a new offset error ΔPnew in step 614, if the P_source_t1 exceeds a range having upper and lower limits 'p' on the basis of the H_refer. The new offset error ΔPnew is calculated taking into account the calculated difference P_source_t1-H_refer. For example, when the calculated difference P_source_t1-H_refer is a positive number, the new offset error ΔPnew is set smaller than the previous offset error. However, when the calculated difference P_source_t1-H_refer is a negative number, the new offset error ΔPnew is set larger than the previous offset error. In addition, as an absolute value of the calculated difference P_source_t1-H_refer is increased more and more, a difference between the new offset error ΔPnew and the previous offset error is increased more and more. However, as the absolute value of the calculated difference P_source_t1-H_refer approaches the H_refer±p more and more, a difference between the new offset error ΔPnew and the previous offset error is decreased more and more.

A method of determining the new offset error ΔPnew based on the absolute value of the calculated difference P_source_t1-H_refer will be described in more detail herein below.

First, if |P_source_t1-H_refer|<p (positive number), the new offset error ΔPnew is set to an offset error previously provided from the BSC. This means that signal strength P_source exists between H_refer+p and H_refer-p in FIG. 7, and for this, the previously assigned offset error is used.

Second, if P_source_t1-H_refer<q (positive number), the new offset error ΔPnew is set to (previous offset error)/m (m>1). This means that the signal strength P_source is considerably higher than the H_refer, and since it is not possible to reduce an offset error without restriction, a lower limit for reducing the offset error is defined.

Third, if p<P_source_t1-H_refer<q, the new offset error ΔPnew is set to (P_source_t1-H_refer+p)/(q-H_refer+p)×(previous offset error)/m. When p<P_source_t1-H_refer<q, a new offset error ΔPnew is linearly calculated according to a difference between the signal strengths.

Fourth, if P_source_t1-H_refer<-q, the new offset error ΔPnew is set to (previous offset error)×n. This means that the P_source is considerably lower than the H_refer, and for this, an upper limit for increasing an offset error is defined.

Fifth, if -q<P_source_t1-H_refer<-p, the new offset error ΔPnew is set to (P_source_t1-H_refer-p)/(q-H_refer+p)×(previous offset error)×n. This is a value corresponding to an intermediate between the third and the fourth methods, and the value is linearly increased.

In sum, the first method is an example where the P_source_t1 uses the previous offset error in an intermediate region (between ±p) on the basis of the H_refer. The second and third methods illustrate where the P_source_t1 reduces the previous offset error m times as much as the maximum previous offset error in a region of over +p. The fourth and fifth methods illustrate where the P_source_t1 increases the previous offset error n times as much as the maximum previous offset error in a region of below -p.

After calculating the new offset error ΔPnew in step 614, the controller 520 monitors in step 616 whether a difference between the two signal strengths P_source_t1 and P_target_t1 is identical to the new offset error ΔPnew. If the previous offset error or the new offset error ΔPnew is identical to the difference between the two signal strengths P_source_t1 and P_target_t1 in steps 618 and 616, the controller performs a handover procedure in step 620. However, If the previous offset error or the new offset error ΔPnew is not identical to the difference between the two signal strengths P_source_t1 and P_target_t1 or smaller than the offset error, the controller 520 does not perform a handover. This is because there is a case where the controller 520 fails to search an instant where the values are identical to each other, as it cannot fully perform the monitoring.

Figure 1:
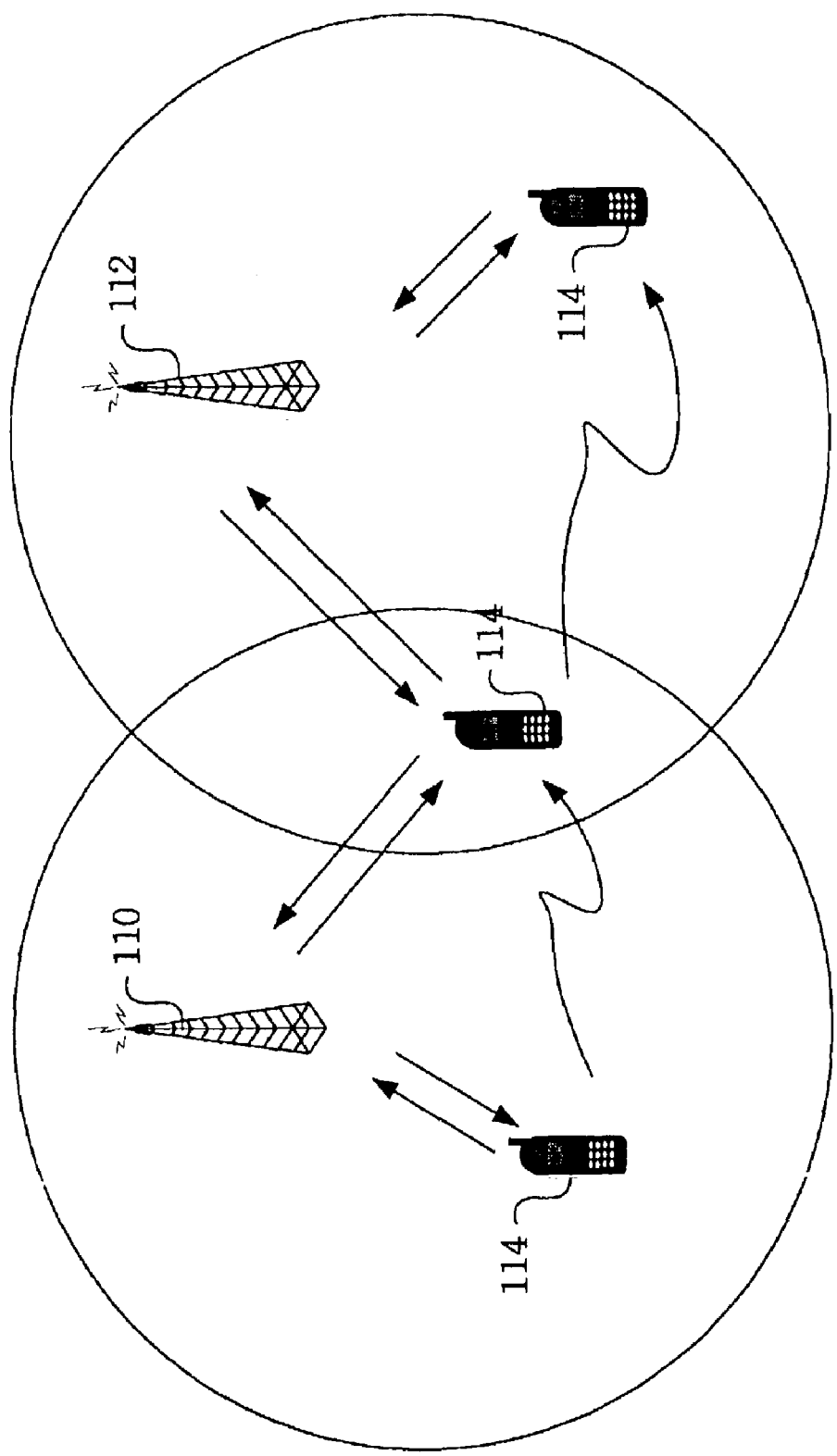
FIG. 1 illustrates a soft handover occurring in a CDMA mobile communication system.
Figure 2:
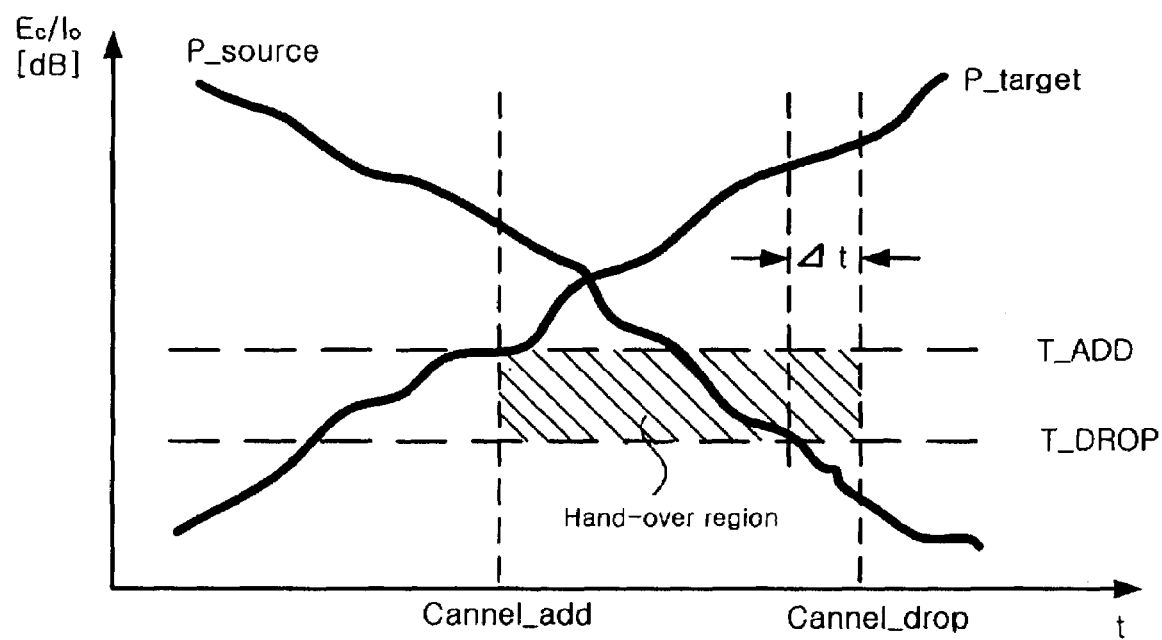
FIG. 2 illustrates an example where a handover occurs in a conventional CDMA mobile communication system.
Figure 3:
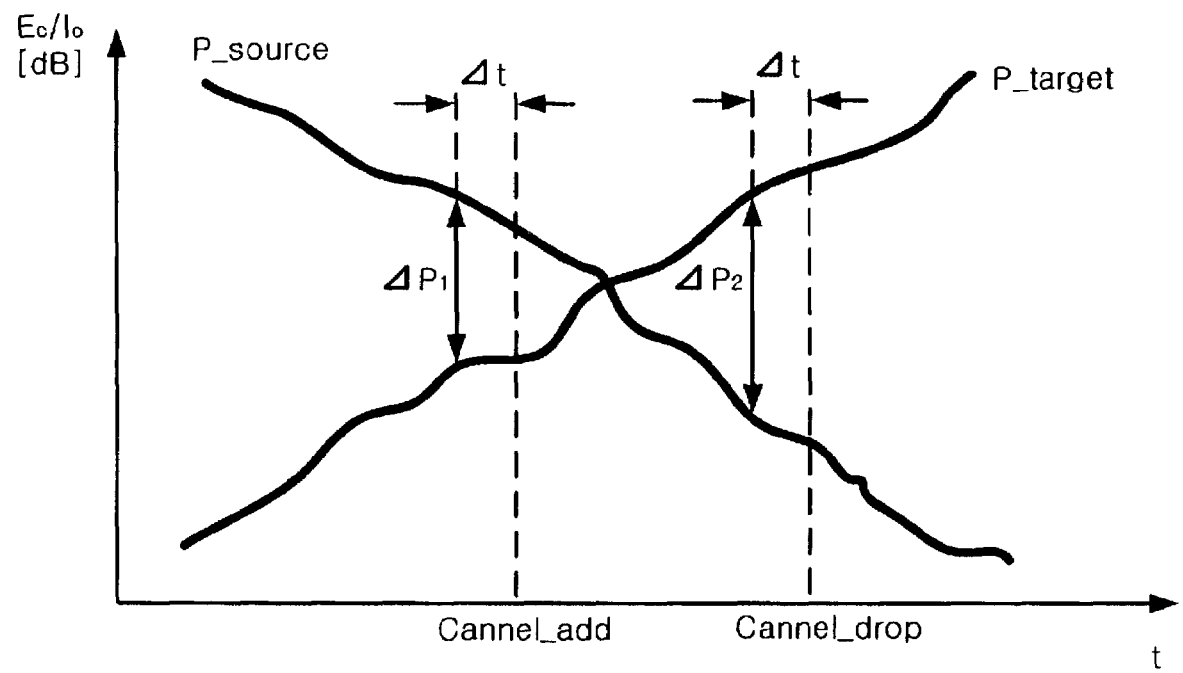
FIG. 3 illustrates another example where a handover occurs in a conventional CDMA mobile communication system.
Figure 4:
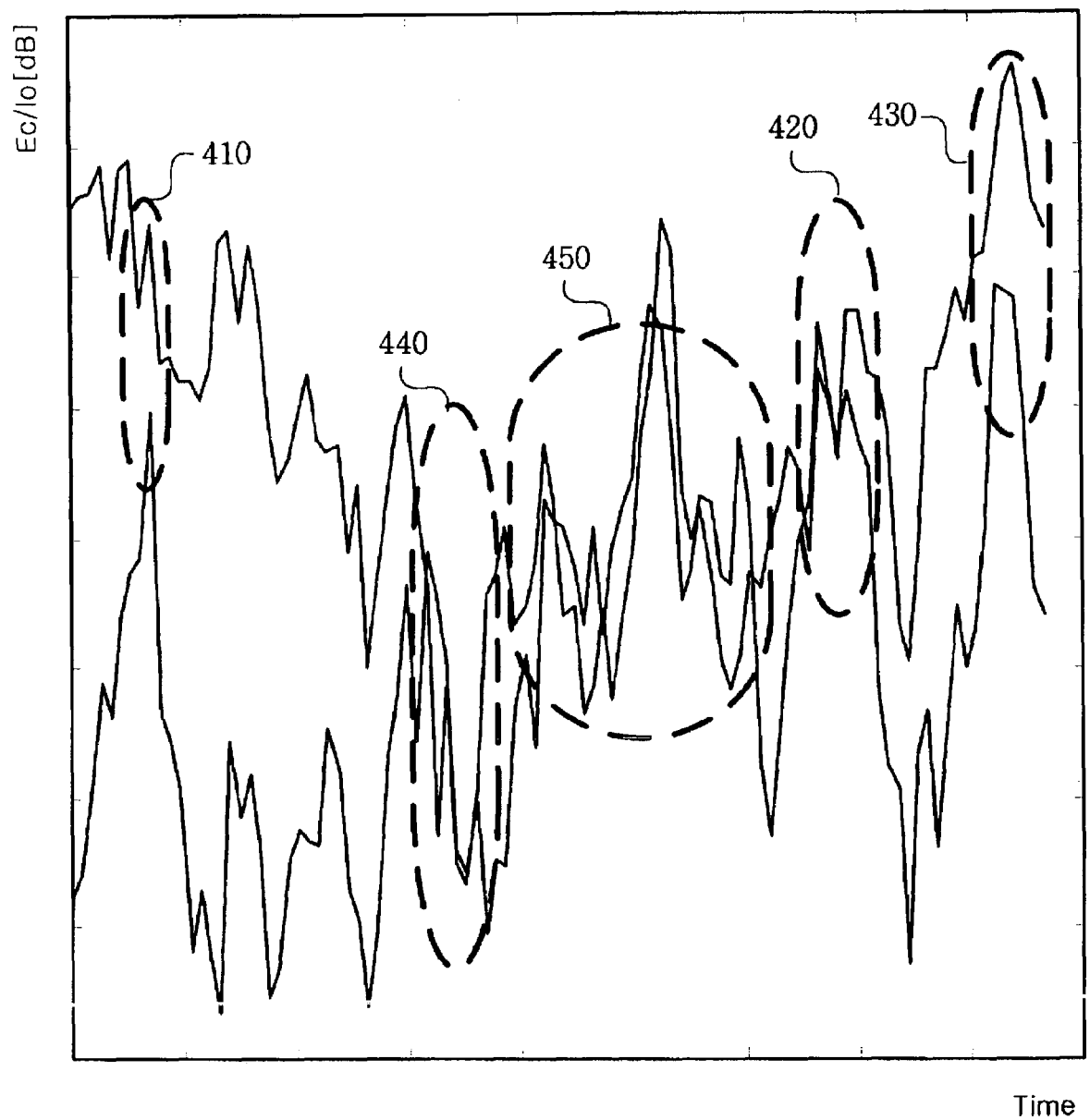
FIG. 4 illustrates examples where a handover occurs in an unstable radio channel environment in a conventional CDMA mobile communication system.
Figure 8:
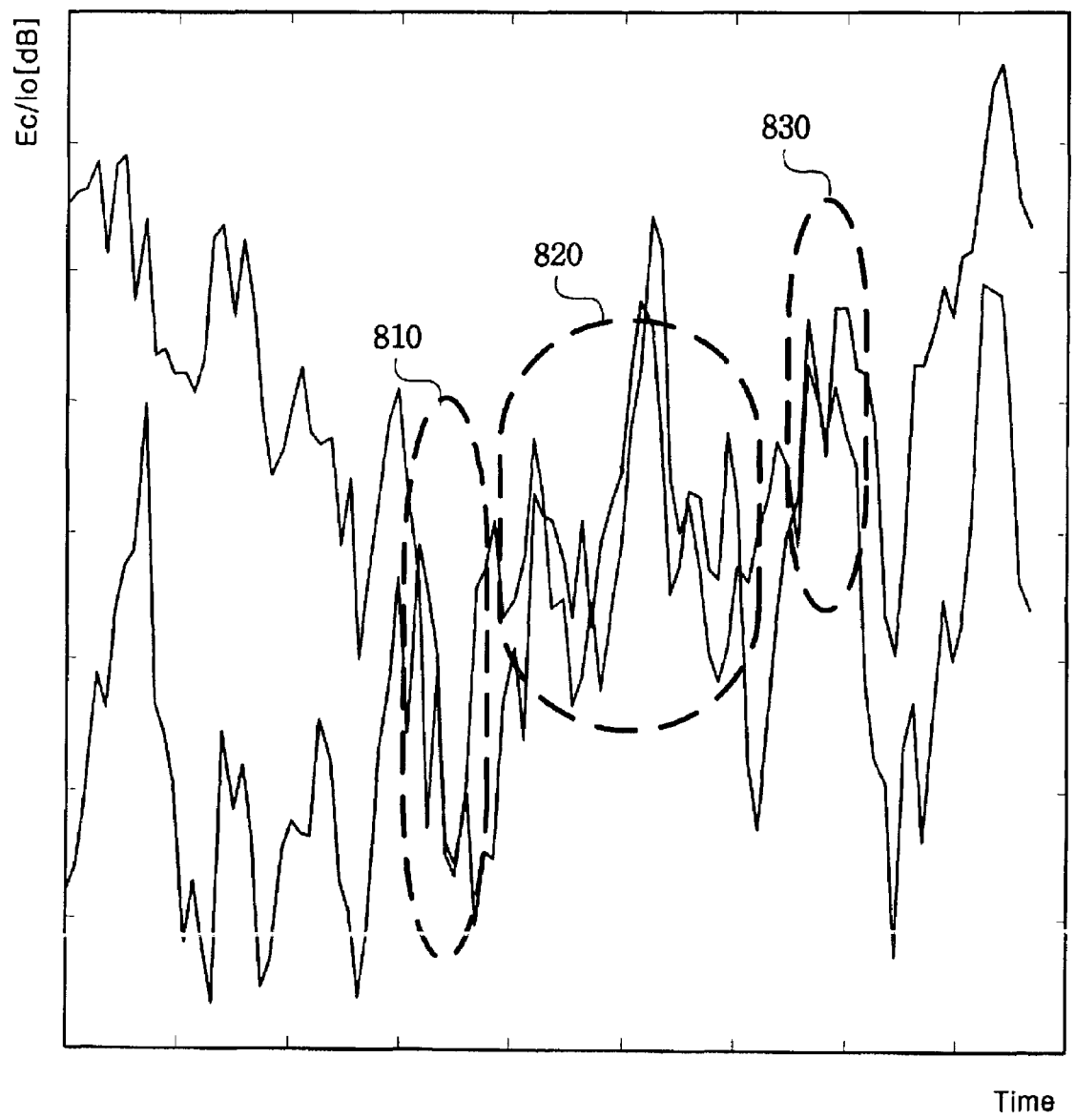
FIG. 8 illustrates examples where a mobile station performs a soft handover in an unstable radio channel environment in a CDMA mobile communication system according to an embodiment of the present invention.

FIG. 8 illustrates an example where an MS performs a handover in an unstable radio channel environment in a CDMA mobile communication system according to an embodiment of the present invention. As illustrated in FIG. 8, when the MS performs a soft handover according to the present invention, an unnecessary handover does not occur in a handover situation caused by an unstable radio channel environment. That is, a handover does not occur in some inappropriate handover situations among the handover situations 410, 420, 430, 440, and 450 as illustrated in FIG. 4. In FIG. 8, a handover is performed only in appropriate handover situations 810, 820, and 830.

Figure 9:
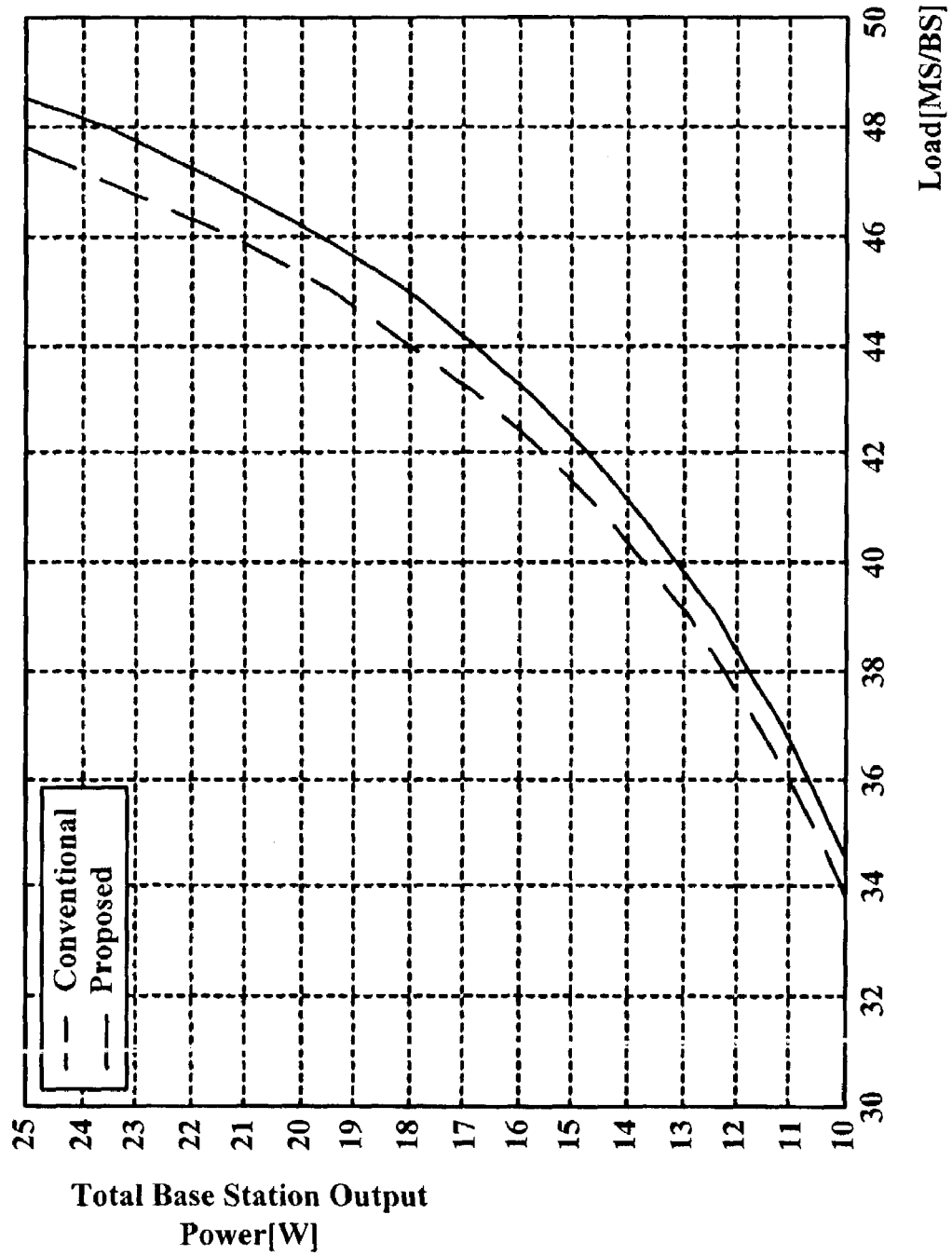
FIG. 9 illustrates a comparison on BTS output power between the conventional soft handover determination method and the proposed soft handover determination method.

FIG. 9 illustrates a comparison on BTS output power, i.e., downlink capacity between the conventional soft handover determination method and the proposed soft handover determination method. As illustrated in FIG. 9, when a cell that can accommodate a maximum of 60 MSs provides a voice service of 8Kbps, the BTS output power is reduced by about 1 to 1.5 watts in a region with capacity of 75% (45 MSs/BTS).

Above, a description has been made of an operation of adding channels. However, one of the two channels set up to the source BTS and the target BTS must be released at an appropriate time. An operation of releasing the channel is performed in a reverse process of the operation of adding channels. That is, the operation is performed using an offset error longer than the previous offset error when the channel must be released in a good channel environment, and the operation is performed using an offset error shorter than the previous offset error when the channel must be released in a poor channel environment. Calculation of the long offset error value can be performed using the second and third formulas in the above-stated channel addition operation, and calculation of the short offset error value can be performed using the fourth and fifth formulas in the channel addition operation.

As described above, the proposed soft handover determination method in a CDMA mobile communication system prevents an unnecessary handover from being frequently performed in a massed area such as a downtown area, contributing to an increase in the capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining by a mobile station whether to perform a soft handover based on measured strengths of a signal received from a source BTS (Base Transceiver Station) to which a traffic channel is currently set up, and a signal received from at least one target BTS in a CDMA (Code Division Multiple Access) mobile communication system, the method comprising the steps of:

determining whether a difference (P source t1 −P target t1) between the strength of the signal received from the source BTS and the strength of the signal received from the target BTS at a prescribed time satisfies a handover request error which is a criterion to request a soft handover;

if the soft handover is requested, calculating a difference (P source −H refer) between the strength of the signal received from the source BTS and a prescribed reference value;

if the difference (P source −H refer) is larger than or equal to the handover request error (a prescribed handover condition P), calculating a new offset error; and performing the soft handover if the difference between the strength of the signal received from the source BTS and the strength of the signal received from the target BTS is smaller than or equal to the calculated new offset error.

2. The method of claim 1, wherein the handover request error to request the soft handover is satisfied when the difference between the strength of the signal received from the source BTS and the strength of the signal received from the target BTS at the prescribed time is smaller than the handover request error.

3. The method of claim 1, wherein the step of calculating the offset error comprises the steps of:

determining whether an absolute value of the difference between the strength of the signal received from the source BTS and the reference value is smaller than a prescribed error value;

if the absolute value is smaller than the error value, stopping controlling the offset error; and if the absolute value is not smaller than the error value, controlling the offset error based on the difference between the strength of the signal received from the source BTS and the strength of the signal received from the target BTS.

4. The method of claim 3, wherein the step of calculating the offset error further comprises the steps of:

setting the offset error so that it is smaller than a previous set offset error, if the absolute value of the difference between the strength of the signal received from the source BTS and the reference value is a positive number; and setting the offset error so that it is larger than a previous set offset error, if the absolute value of the difference between the strength of the signal received from the source BTS and the reference value is a negative number.

5. An apparatus for determining by a mobile station whether to perform a soft handover based on a difference between a strength of a signal received from a source BTS (Base Transceiver Station) to which a traffic channel is currently set up, and a strength of a signal received from at least one target BTS in a CDMA (Code Division Multiple Access) mobile communication system, the apparatus comprising:

a first finger for receiving the signal from the source BTS and measuring the strength of the received signal;

a second finger for receiving the signal from the target BTS and measuring the strength of the received signal; and a controller for calculating an offset error in proportion to an absolute value of a difference between the strength of the signal received from the source BTS and a prescribed reference value, if a difference between the measured signal strength from the first finger and the measured signal strength from the second finger satisfies a handover request error which is a criterion to request a soft handover, and performing the soft handover if the difference between the strength of the signal received from the source BTS and the reference value is smaller than or equal to the calculated offset error.

6. The apparatus of claim 5, wherein the handover request error to request the soft handover is satisfied when the difference between the strength of the signal received from the source BTS and the strength of the signal received from the target BTS at the prescribed time is smaller than the handover request error.

7. The apparatus of claim 5, wherein the controller calculates the offset error based on the difference between the strength of the signal received from the source BTS and the strength of the signal received from the target BTS if an absolute value of the difference between the strength of the signal received from the source BTS and the reference value is not smaller than a value of a prescribed offset error.

8. The apparatus of claim 5, wherein the controller calculates the offset error so that it is set smaller than a previous set offset error if the absolute value of the difference between the strength of the signal received from the source BTS and the reference value is a positive number; and the controller calculates the offset error so that it is set larger than a previous set offset error if the absolute value of the difference between the strength of the signal received from the source BTS and the reference value is a negative number.

* * * * *